Aug. 7, 1951  W. ENGEL  2,563,593
SURGICAL BANDAGE
Filed March 18, 1949
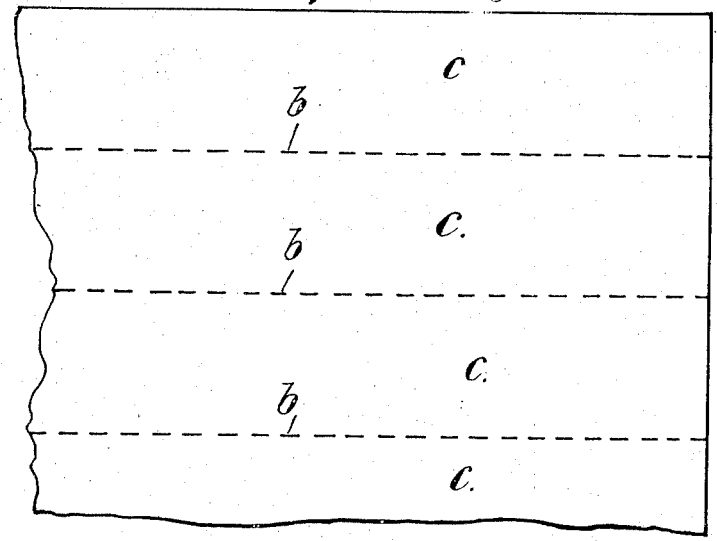
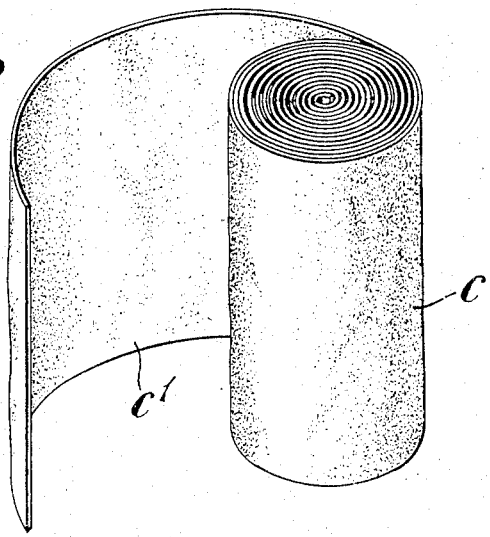
INVENTOR
WALTER ENGEL
BY: Francis E. Boyce
ATTORNEY Patented Aug. 7, 1951

2,563,593

UNITED STATES PATENT OFFICE 2,563,593

SURGICAL BANDAGE

Walter Engel, High Holborn, London, England

Application March 18, 1949, Serial No. 82,125
In Great Britain December 13, 1948

3 Claims. (Cl. 167—84)

1

This invention relates to surgical bandages, and its object is to provide a surgical bandage which offers advantages over the usual surgical bandages hitherto in use.

A surgical bandage as hitherto provided is either composed of a strip of woven fabric woven in such a manner as to permit the bandage to adapt itself more or less to the contour of the part bandaged therewith, or consists of a strip of rubber. It is also quite likely that a synthetic plastic having properties somewhat similar to rubber, such as plasticised polyvinyl chloride, has been used as a bandage. However, whatever their composition, such bandages after being applied in a stretched condition, quickly acquire a permanent set, which soon causes them to become slack around the parts bandaged, and therefore to be liable to slip, and require to be undone and reapplied at frequent short intervals.

By permanent set is meant the portion of the capability of elastic recovery which is gradually progressively lost by stretched rubber and rubberlike material.

Medicaments can be incorporated in synthetic plastics such as thermoplastic synthetic resins, and may themselves be plasticisers thereof or be associated with a normal plasticiser.

By medicament is meant a substance which is used for its therapeutic or reputed therapeutic effect on an animal organism and particularly on the human organism.

The object of the present invention is to provide a medicated surgical bandage composed of a flaccid strip of synthetic plastic, particularly plasticised polyvinyl chloride, which when secured in a stretched condition around a part bandaged will not slacken.

For the above purpose, according to the invention, a surgical bandage, or a sheet from which a bandage can be cut, composed of a flaccid rubberlike synthetic plastic, particularly plasticised polyvinyl chloride, has incorporated therein a medicament producing shrinkage of the bandage by separating therefrom, at a rate approximately equal to and compensating for permanent set of the bandage when stretched.

The incorporated medicament producing shrinkage of the bandage on separation therefrom, may be a constituent of or associated with the plasticizer wherewith the synthetic plastic is plasticised. Moreover, as the bandage is applied for therapeutic purposes, the separating medicament conveniently can be a medicament which is itself a plasticiser of the synthetic plastic. Thus, for instance, a polyvinyl chloride bandage can be plasticised wholly or in part with methyl salicylate. When such a bandage is applied directly to the skin, the methyl salicylate is gradually yielded up from the bandage and continuously passes transcutaneously into the patient's body, as contrasted with the intermittent transmission which alone can be affected by an ointment or an alcoholic lotion containing methyl salicylate.

As the medicated non-slackening bandage is applied directly to the skin, that is to say, without an interposed dressing, the bandage is, preferably, sufficiently transparent to enable the condition of the part covered to be seen therethrough. Such a transparent bandage can be produced by dissolving completely the plastic, such as polyvinyl chloride, in a plasticizer, not necessarily entirely the medicament, which forms a solid solution thereof at atmospheric temperatures. For example, powdered polyvinyl chloride dispersed in sufficient dibutyl phthalate not only to form a mobile paste at atmospheric temperatures but also completely to dissolve the polyvinyl chloride when heated to a gelatinising temperature, can, before being heated, be poured onto a flat horizontal surface to form a sheet. On heating, such poured and spread paste containing sufficient plasticiser, gelatinises and sets as a more or less glass-clear transparent sheet without change of volume.

To avoid expensive loss of the medicament, the heating can be effected in a confined space, wherein a vapour at the vapour pressure of the medicament is produced.

The transparent bandage may be coloured to provide a filter for radiations, such as light.

Strip bandages can be cast in the above manner, or can be cut from so-cast sheets.

The casting of the bandage imparts a surface thereto which has a high coefficient of friction, and therefore superposed layers of the bandage will not readily slip.

The presence of ample plasticiser renders the bandage readily soluble, so that the outer end of the bandage can be readily rendered adhesive by wetting with a suitable solvent and stuck to the next underlying layer of the bandage to secure the bandage.

If not caused by a contained medicament, the bandage can be rendered aseptic or antiseptic or insecticidal or insectifugal, by the incorporation into its composition of a suitable bactericide, insecticide or insectifuge.

In the accompanying drawing:

Fig. 1 is a plan of a portion of a sheet from which bandages can be cut, and

Fig. 2 is a perspective view, on a larger scale, of a bandage.

*a* is a portion of a sheet of polyvinyl chloride, in which a medicament has been incorporated in a proportion to cause shrinkage by loss of the medicament at a rate sufficient approximately to neutralise permanent set when stretched. Such a sheet can be cut along lines *b* into strips *c* to constitute bandages.

A rolled up strip *c* of medicated polyvinyl chloride to serve as a bandage, the leading portion $c^1$ of which is unwound, is shown in Fig. 2.

Representative compositions for the bandage, for example, are as follows:

Example I

One part by weight polyvinyl chloride
One part by weight dibutyl phthalate
One part by weight methyl salicylate

Example II

One part by weight polyvinyl chloride
One part by weight tricresyl phosphate
One part by weight crude coal tar

Example III

One part by weight polyvinyl chloride
One part by weight chlorinated paraffin wax
One part by weight copolymers of abietic and pimaric acids
One part by weight tributyl citrate
One-tenth part by weight chloroxylenol
One part by weight benzyl benzoate

I claim:

1. A surgical bandage remaining taut when applied composed of a solid solution of approximately equal proportions by weight of polyvinyl chloride, dibutyl phthalate and methyl salicylate.

2. A surgical bandage remaining taut when applied and composed of plasticised polyvinyl chloride and approximately 33 per cent by weight of methyl salicylate.

3. A surgical bandage remaining taut when applied and composed of a plasticized polyvinyl compound and approximately 33 per cent by weight of methyl salicylate.

WALTER ENGEL.

REFERENCES CITED

The following references are of record in the file of this patent:

UNITED STATES PATENTS

| Number | Name | Date |
| --- | --- | --- |
| 1,443,081 | Mackintosh | Jan. 23, 1923 |
| 1,967,923 | Connolly | July 24, 1934 |
| 2,126,179 | Duggan | Aug. 9, 1938 |
| 2,164,360 | Strauch | July 4, 1939 |
| 2,273,466 | Dinsmore | Feb. 17, 1942 |
| 2,273,873 | Klein | Feb. 24, 1942 |
| 2,280,506 | Betts | Apr. 21, 1942 |
| 2,282,274 | Weiswasser | May 5, 1942 |
| 2,387,642 | Calhoun | Oct. 23, 1945 |

FOREIGN PATENTS

| Number | Country | Date |
| --- | --- | --- |
| 565,181 | Great Britain | Jan. 31, 1947 |
| 585,184 | Great Britain | Jan. 31, 1947 |
| 448,742 | Great Britain | June 15, 1936 |

OTHER REFERENCES

Merck's Index, 4th ed., 1930, pub. by Merck & Co., Inc., Rahway, New Jersey, page 336.